C. SCHRAMM

Aug. 22, 1933. MACHINE FOR SHAPING THE BACKS OF UNBOUND BOOKS Re. 18,920

3 Sheets-Sheet 1

Original Filed Feb. 12, 1932

INVENTOR

Carl Schramm, by

Harry R. Williams

Atty.

C. SCHRAMM

Aug. 22, 1933. MACHINE FOR SHAPING THE BACKS OF UNBOUND BOOKS Re. 18,920

3 Sheets-Sheet 2

Original Filed Feb. 12, 1932

INVENTOR

Carl Schramm by

Harry R. Williams Atty.

C. SCHRAMM
Aug. 22, 1933. MACHINE FOR SHAPING THE BACKS OF UNBOUND BOOKS Re. 18,920
3 Sheets-Sheet 3
Original Filed Feb. 12, 1932
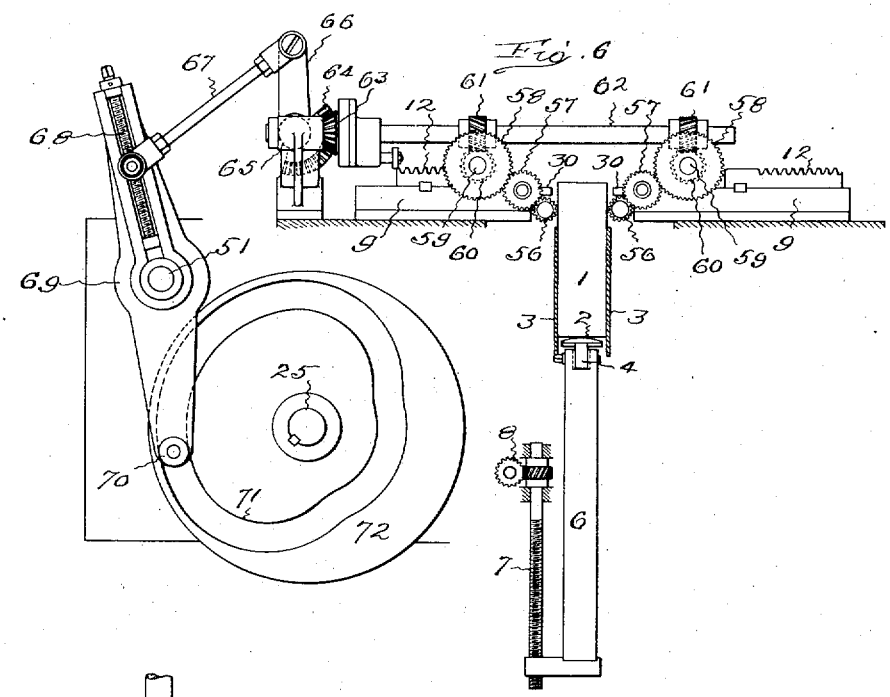
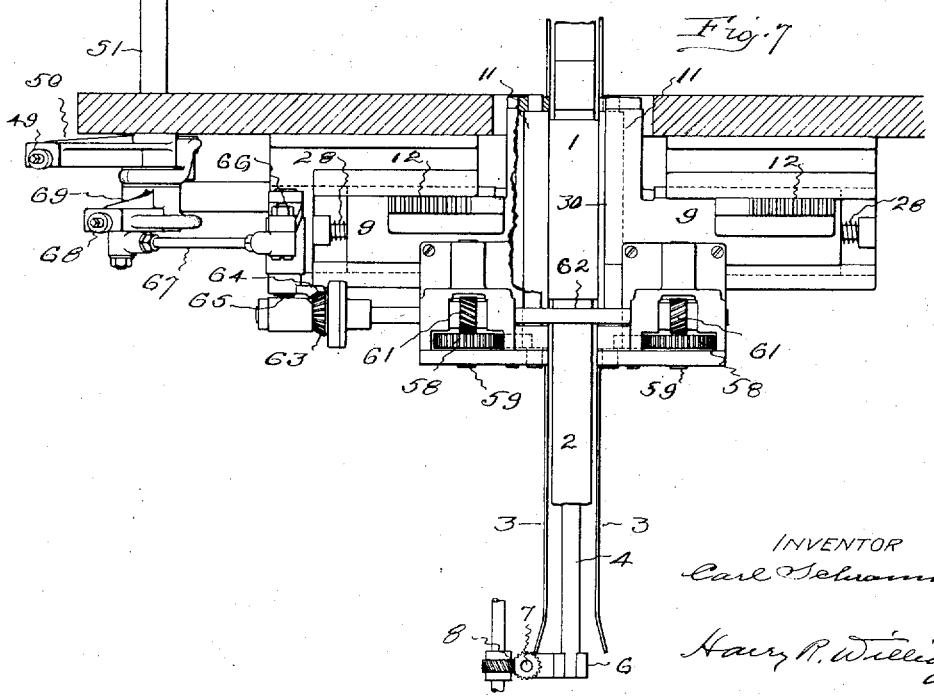
INVENTOR
Carl Schramm
by
Harry R. Williams
Atty Reissued Aug. 22, 1933

Re. 18,920

UNITED STATES PATENT OFFICE 18,920

MACHINE FOR SHAPING THE BACKS OF UNBOUND BOOKS

Carl Schramm, North Coventry, Conn., assignor to The Smyth Manufacturing Company, Hartford, Conn., a Corporation of Connecticut Original No. 1,864,557, dated June 28, 1932, Serial No. 592,483, February 12, 1932. Application for reissue May 31, 1933. Serial No. 673,744

21 Claims. (Cl. 11—5)

This invention relates to machines for shaping the backs of unbound books, of the type disclosed in United States Patent No. 1,802,355, April 28, 1931.

Often books which are to be jointed are composed of thicker signatures on one side than the other; sometimes the back edge of one or more of the signatures on one side or the other will be below the remaining signatures; frequently books are presented which have distorted backs, that is, to have one side higher than the other, occasionally books to be jointed come trimmed with their front edges out of square, or with deckle or rough edges; and it may occur that the stitching of the signatures is tighter at one end of the backs than at the other; all of which contingencies, unless rectified, tend to cause the machine to form joints which are not uniform on each side or are not the same from end to end, whether the books are to be finished with flat backs or round backs.

The object of the present invention is to provide means which will justify the backs of unbound books of various sizes as they are fed into the jointing machine, so that the joints will be formed uniform on each side and will be the same for the entire length of the backs.

In the back shaping machine which is provided with mechanisms that embody this invention, the books are advanced, by suitable feed means with their front edges resting on a supporting bar, to a position between yielding blocks that engage the sides just below the backs and straighten up and sustain the books upright. When the books are thus supported plates descend and by pressure against the backs level and impart an initial round to the backs. As the leveling plates are about to be raised, rolls carried by the same slides that carry the righting blocks, are pinched against the sides of the books and rotated so as to simultaneously complete the rounding of the backs and elevate the books. In this lifted position the books are grasped by jaws and carried to the clamps that hold them while they are being jointed.

Figure 1:
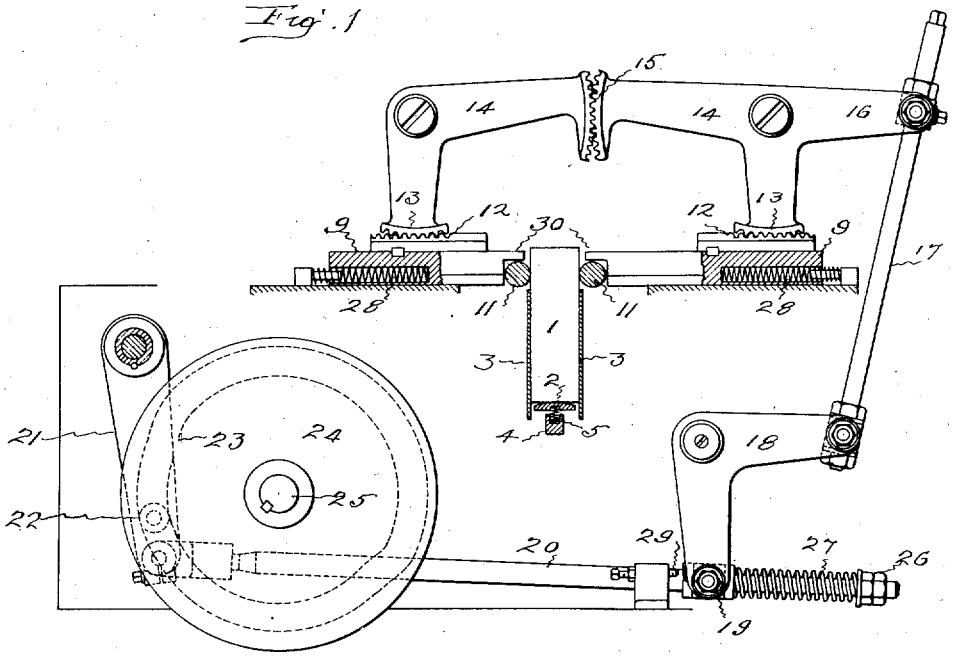
Figure 2:
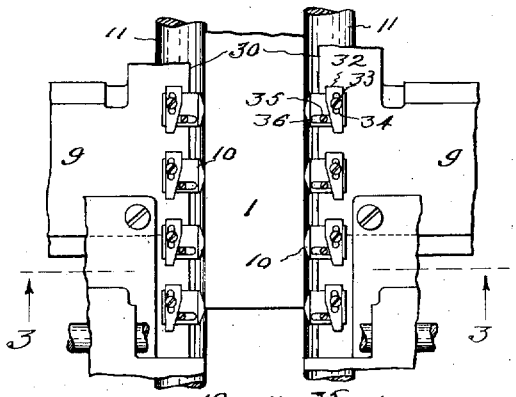
Figure 3:
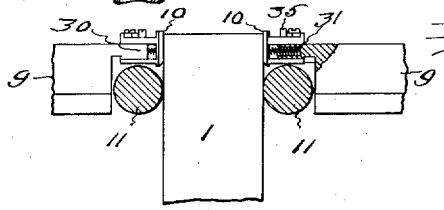
Figure 4:
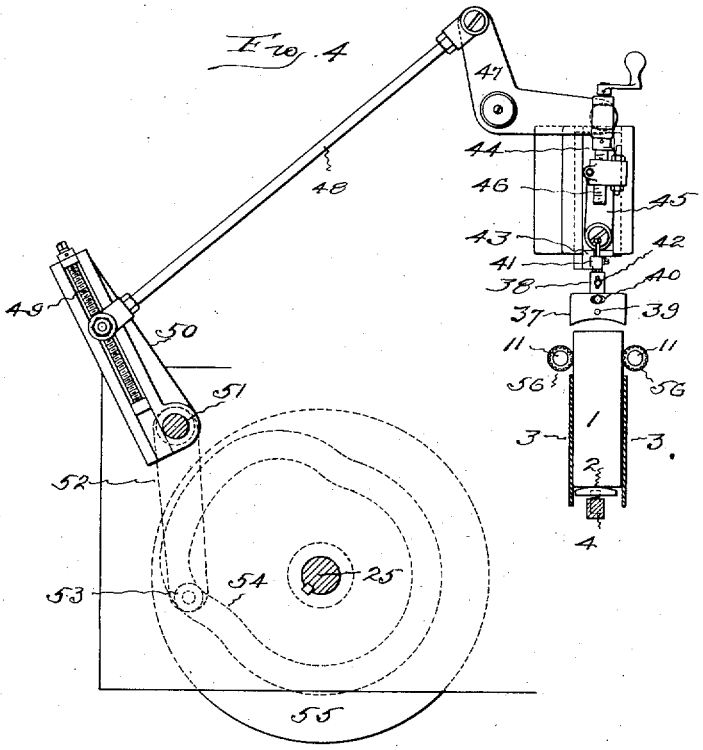
Figure 5:
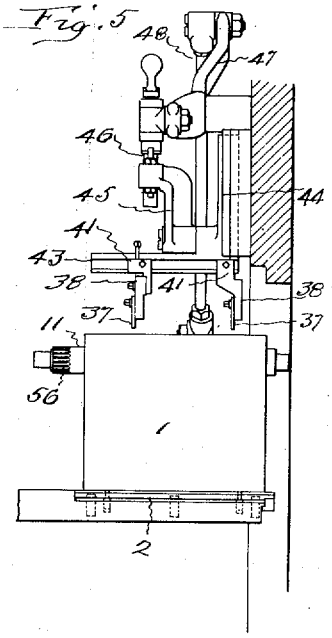
Figure 8:
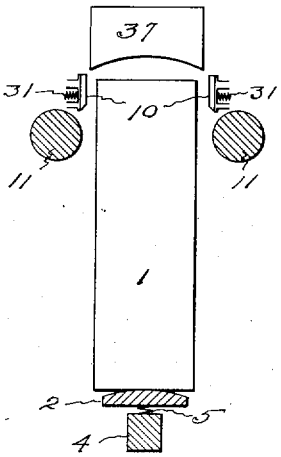
Figure 9:
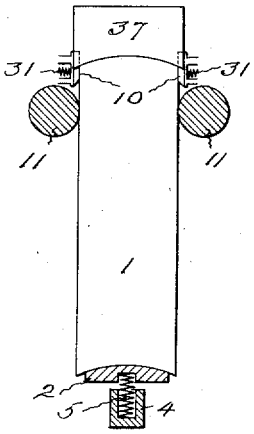
Figure 10:
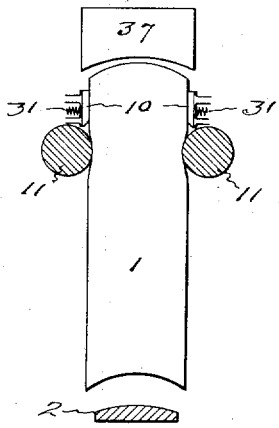

In the accompanying drawings Fig. 1 illustrates a side elevation of the mechanism for reciprocating the slides which carry the righting blocks and the rounding rolls against the sides of the book. Fig. 2 on larger scale shows a plan of a fragment of these slides with the righting blocks and rounding rolls. Fig. 3 is a section taken on the plane indicated by the dotted line 3—3 on Fig. 2. Fig. 4 is a front elevation of the mechanism for vertically reciprocating the slide carrying the leveling plates. Fig. 5 is a side elevation of the mechanism for reciprocating the leveling plates. Fig. 6 is a side elevation of the mechanism for rotating the rounding rolls. Fig. 7 is a plan with portions broken away of the rounding roll rotating mechanism. Fig. 8 is a diagrammatic view illustrating the relative positions of a book, righting blocks, leveling plates and rounding rolls, as the book is first fed between these elements. Fig. 9 is a similar view illustrating the action of the leveling plates. Fig. 10 is a similar view illustrating the action of the rounding rolls.

The books 1 are fed endwise into the machine along a horizontal supporting bar 2 between side plates 3, by any suitable mechanism, for example, such as that illustrated and described in the patent above referred to. The upper surface of the supporting bar is convex if the backs of the books are to be rounded, but it may be flat if the backs of the books are to be finished square. The supporting bar is mounted on a rail 4, with interposed cushioning springs 5, the rail being attached at its ends to posts 6 that may be raised or lowered by screws 7 and gears 8, as in the prior machine. The bar is adjusted vertically to accommodate books of different widths, and the cushions on the springs compensate for slight differences in the width of the books or books which have rough front edges, or books which have been imperfectly trimmed.

The feed delivers the books between similar horizontally movable slides 9 which carry righting blocks 10 and rounding rolls 11. Attached to the tops of the slides are straight racks 12 that are engaged by curved racks 13 at the lower ends of angle levers 14, Fig. 1. The upper ends of the angle levers are provided with intermeshing curved racks 15 so that the slides will be operated synchronously. One of the angle levers has an extension 16 that is connected by a rod 17 with the upper end of an angle lever 18. The lower end of the lever 18 is connected with a collar 19 on a link 20 that is jointed to a rocker arm 21 which has a roll 22 that lies in a cam groove 23 in the disk 24 on the cam shaft 25. Between the collar 19 and nuts 26 on the end of the link 20 is a relatively stiff spring 27. Lighter springs 28 are arranged between the outer ends of the slides and the frame of the machine, Fig. 1.

When the roll 22 passes to the high arc of the cam 23 the link 20 through the spring 27 causes the lever 18 and rod 17 to rock the angle levers 14 in such direction that the slides 9 move toward each other and the rounding rolls press heavily against the sides of the book. As the roll passes to the low arc of the cam the tension of the heavy spring 27 is relieved and the slides are pressed inward only by the tension of the lighter springs 28, their inward movement at this time being limited by the adjustment of the stop screw 29 that is set to engage the collar 19 at the lower end of the angle lever 18, Fig. 1.

The righting blocks 10 engage the books just below the backs and keep them straight. The blocks are movable along projecting ledges 30 at the inner edges of the slides 9, and they are pressed toward the books by spring 31, Fig. 3. There may be any number of these blocks and they are positioned according to the height of the books which they are to straighten and support. The springs 31 normally retain the faces of the blocks a slight distance in advance of the rounding rolls so they may guide and straighten the books as they are fed between them, but they yield when the slides are closed for causing the rounding rolls to tightly pinch the books. Wedges 32 are fastened to the blocks by screws 33 that pass through slots 34 in the wedges into the blocks. Studs 35 extend upward from the slide through slots 36 in the blocks. The wedges are set to engage the studs for the purpose of limiting the inward movement of the blocks under the pressure of the spring 31, Figs. 2, 3.

When straightened and sustained by the righting blocks the backs of the books are engaged and pressed down by vertically movable leveling plates 36, as illustrated in Fig. 9. There may be any number of these leveling plates, and if the book backs are to be rounded the leveling plates have concave lower edges, but if the backs are to be flat the leveling plates may have flat lower edges.

The two leveling plates shown are fastened to stems 38 by a pivot stud 39 and a screw and slot connection 40 so that they may be oscillated transversely to the backs of the books and adjusted to books the signatures of which may be thicker on one side than the other. The stems 38 are fastened to slides 41, the front stem preferably by a screw and slot connection 42, so that the front plate may be adjusted vertically with relation to the rear plate, to properly act on books that happen to be sewed tighter at one edge than the other. The slides 41 are adjustable horizontally along an arm 43 so that they may be located in the required positions for engaging the backs of books of different widths, Figs. 4, 5.

The arm 43 extends horizontally forward from the lower end of a vertically movable slide 44. This slide has a link 45 that is connected by an adjusting screw 46 with one end of an angle lever 47. A rod 48 connects the other end of this lever with a screw 49 which is mounted in a rocker arm 50 on a shaft 51 that has a rocker arm 52 with a roll 53 lying in the cam groove 54 of a disk 55 on the cam shaft, Fig. 4. This cam is timed to cause the leveling plates to engage the backs and press the books down on the supporting bar and impart the initial shape to the backs while the books are sustained by the righting blocks. The leveling plates remain in that position until the rounding rolls have been pinched tightly against the sides of the book by the mechanism previously mentioned, and then the leveling plates are lifted. By turning the screw 49 on the rocker 50 the amount of vertical travel of the leveling plates may be adjusted, and by turning the screw 46 the limits of the up and down movement of the leveling plates may be determined. The movements of the leveling plates are adjusted with relation to the rounding rolls.

After the books are pressed down onto the supporting bar and the rounding rolls tightly closed against the sides the leveling plates are raised and the rolls are rotated so as to lift the books, and by their rolling pressure on the sides complete the rounding of the backs. The greater the upward feed of the rolls the more the backs will be rounded. On the outer ends of the rounding rolls are pinion teeth 56. These are engaged by gears 57 in mesh with gears 58 on shafts 59 that have spiral gears 60 which are engaged by spiral gears 61 on a shaft 62, Fig. 6. At one end of this shaft is a bevel pinion 63 that is engaged by a toothed segment 64 on a shaft 65 which has a rocker arm 66. This rocker arm is connected by a link 67 with a screw carried by the upper limb of a lever 69. This lever at its lower end has a roll 70 that lies in a cam groove 71 in the disk 72 on the cam shaft, Fig. 6.

The cam 71 is timed to, through the lever, link and gears, cause the rolls after they have been pinched against the sides of the book, rotate and lift the book. By turning the screw 68 the amount of this lifting movement of the rolls may be adjusted.

If it is desired to finish a book with a flat back a flat supporting bar is substituted for the convex bar shown and leveling plates with straight edges are substituted for the plates with concave edges, and the rounding rolls are restrained from pinching the books.

After the backs are shaped the books are clamped and carried between jaws which are closed against the sides so as to hold them securely while the backs are being ironed over the edges of the jaws to form the joints, by such mechanism as is shown in the prior patent referred to. This mechanism is adapted to be used to justify, that is, straighten, align and sustain in required shape and position, the backs of unbound books of various heights, widths, and thicknesses, so that they will be jointed with exactness, even should they be trimmed unevenly, or stitched tighter at top or bottom, or have thicker signatures on one side than the other.

The invention claimed is:

1. Mechanism for shaping the backs of unbound books which comprises means for supporting the books, means movable toward the sides of the books for straightening and sustaining the backs, means movable against the backs while sustained for pressing the backs into initial shape, and means movable with the straightening and sustaining means for elevating the books.

2. Mechanism for shaping the backs of unbound books which comprises a yielding supporting bar, means for vertically adjusting said bar, means movable toward the sides of the books for straightening and sustaining the backs, means movable against the backs while sustained for pressing the backs into initial shape, and means movable with the straightening and sustaining means for elevating the books.

3. Mechanism for shaping the backs of unbound books which comprises a supporting bar with a convex upper surface, means for raising and lowering said bar, springs interposed between said bar and the raising and lowering means, means movable toward the sides of the books for straightening and sustaining the backs, means movable against the backs while sustained for pressing the backs into initial shape, and means movable with the straightening and sustaining means for elevating the books.

4. Mechanism for shaping the backs of unbound books which comprises means for supporting the books, yielding blocks movable toward the sides of the books for straightening and sustaining the book backs, means movable against the book backs while sustained by the blocks for pressing the backs into initial shape, and means movable with the blocks for elevating the books.

5. Mechanism for shaping the backs of unbound books which comprises means for supporting the books, slides movable toward the sides of the books, yielding blocks carried by said slides for straightening and sustaining the book backs, means for adjusting said blocks inward or outward on said slides, means movable against the book backs while sustained by the blocks for pressing the backs into initial shape, and means movable with the slides for elevating the books.

6. Mechanism for shaping the backs of unbound books which comprises means for supporting the books, slides movable toward the sides of the books, yielding blocks carried by said slides for straightening and sustaining the book backs, means for adjusting said blocks transversely of the movements of the slides, means movable against the book backs while sustained by the blocks for pressing the backs into initial shape, and means movable with the slides for elevating the books.

7. Mechanism for shaping the backs of unbound books which comprises means for supporting the books, slides movable toward the sides of the books, yielding blocks carried by said slides for straightening and sustaining the book backs, means for adjusting said blocks longitudinally of and transversely of the movements of the slides, means movable against the book backs while sustained by the blocks for pressing the backs into initial shape, and means movable with the slides for elevating the books.

8. Mechanism for shaping the backs of unbound books which comprises means for supporting the books, slides movable toward the sides of the books, blocks mounted on said slides for straightening and sustaining the book backs, means movable against the book backs while sustained by the blocks for pressing the backs into initial shape, and rolls movable with the slides for elevating the books.

9. Mechanism for shaping the backs of unbound books which comprises means for supporting the books, slides movable toward the sides of the books, blocks yieldingly mounted on the slides for straightening and sustaining the book backs, means movable against the book backs while sustained by the blocks for pressing the backs into initial shape, and rolls movable with the slides for elevating the books, said blocks having their faces normally in front of and engaging the sides of the books in advance of the rolls.

10. Mechanism for shaping the backs of unbound books which comprises means for supporting the books, slides movable toward the sides of the books, blocks yieldingly mounted on the slides for straightening and sustaining the book backs, means movable against the book backs while sustained by the blocks for pressing the backs into intial shape, rolls movable with the slides for elevating the books, and gearing carried by said slides for rotating the rolls.

11. Mechanism for shaping the backs of unbound books which comprises means for supporting the books, means movable horizontally toward the sides of the books for straightening and sustaining the book backs, leveling plates movable vertically against the backs while sustained for pressing the backs into initial shape, and means movable with the straightening and sustaining means for elevating the books.

12. Mechanism for shaping the backs of unbound books which comprises means for supporting the books, means movable horizontally toward the sides of the books for straightening and sustaining the book backs, a vertically movable slide, leveling plates carried by the slide against the backs while sustained for pressing the backs into initial shape, means for effecting the vertical adjustment of the plates with relation to the slide, and means movable with the straightening and sustaining means for elevating the books.

13. Mechanism for shaping the backs of unbound books which comprises means for supporting the books, means movable horizontally toward the sides of the books for straightening and sustaining the book backs, a vertically movable slide, leveling plates carried by the slide against the backs while sustained for pressing the backs into initial shape, means for effecting an oscillatory adjustment of the plates with relation to the slide, and means movable with the straightening and sustaining means for elevating the books.

14. Mechanism for shaping the backs of unbound books which comprises means for supporting the books, means movable horizontally toward the sides of the books for straightening and sustaining the book backs, a vertically movable slide, leveling plates carried by the slide against the backs while sustained for pressing the backs into initial shape, means for effecting a transverse adjustment of the plates with relation to the slide, and means movable with the straightening and sustaining means for elevating the books.

15. Mechanism for shaping the backs of unbound books which comprises means for supporting the books, means movable horizontally toward the sides of the books for straightening and sustaining the book backs, a vertically movable slide, mechanism for reciprocating the slide, said mechanism including adjusting means which permits of varying the length of the slide movements and permits of varying the limits of the slide movements, leveling plates carried by the slide against the backs while sustained for pressing the backs into initial shape, and means movable with the straightening and sustaining means for elevating the books.

16. Mechanism for shaping the backs of unbound books which comprises means for supporting the books, slides movable horizontally toward the sides of the books, blocks yieldingly mounted on the slides for straightening and sustaining the book backs, leveling plates movable vertically against the book backs while sustained by the blocks for pressing the backs into initial shape, and rolls movable with the slides for elevating the books.

17. Mechanism for shaping the backs of unbound books which comprises means for supporting the books, slides movable horizontally toward the sides of the books, blocks yieldingly mounted on the slides for straightening and sustaining the book backs, and leveling plates movable vertically against the book backs while sustained by the blocks for pressing the backs into initial shape.

18. Mechanism for shaping the backs of unbound books which comprises means for supporting the books, means movable horizontally toward the sides of the books for straightening and sustaining the book backs, a vertically movable slide, leveling plates carried by the slide against the backs while sustained for pressing the backs into initial shape, and means for effecting an oscillatory adjustment of the plates with relation to the slide.

19. Mechanism for shaping the backs of unbound books which comprises means for supporting the books, slides movable horizontally toward the sides of the books, blocks yieldingly mounted on the slides for straightening and sustaining the book backs, and means movable vertically against the backs while sustained for pressing the backs into initial shape.

20. Mechanism for shaping the backs of unbound books which comprises means for supporting the books, means for sustaining the books in a vertical position with their backs up, means movable against the backs of the books while thus sustained for leveling the backs into initial shape, and rolls mounted to turn against the sides of the books and by their pressure and rotation cause a rounding of the book backs.

21. Mechanism for shaping the backs of unbound books which comprises means for supporting the books, means adjustable horizontally toward the sides of the books for straightening and sustaining the books, leveling plates movable vertically against the backs while thus sustained for pressing the backs into initial shape, and rotatable rolls movable against the sides of the books and by their pressure and rotation adapted to cause a rounding of the book backs.

CARL SCHRAMM.